United States Patent
Fidan

(10) Patent No.: US 10,328,749 B2
(45) Date of Patent: Jun. 25, 2019

(54) CAP PLY STRIP WITH ALTERNATE NYLON 6,6 AND PET CORDS

(71) Applicant: KORDSA TEKNIK TEKSTIL ANONIM SIRKETI, Izmit (TR)

(72) Inventor: Mehmet Sadettin Fidan, Istanbul (TR)

(73) Assignee: KORDSA TEKNIK TEKSTIL ANONIM SIRKETI, Izmit (TR)

( * ) Notice: Subject to any disclaimer, the term of this patent is extended or adjusted under 35 U.S.C. 154(b) by 0 days.

(21) Appl. No.: 15/739,757

(22) PCT Filed: Oct. 13, 2016

(86) PCT No.: PCT/TR2016/050382
§ 371 (c)(1),
(2) Date: Dec. 25, 2017

(87) PCT Pub. No.: WO2018/070951
PCT Pub. Date: Apr. 19, 2018

(65) Prior Publication Data
US 2018/0333989 A1   Nov. 22, 2018

(51) Int. Cl.
| | |
|---|---|
| *B60C 9/00* | (2006.01) |
| *D03D 1/00* | (2006.01) |
| *D03D 15/00* | (2006.01) |
| *B60C 11/00* | (2006.01) |
| *B60C 9/22* | (2006.01) |

(52) U.S. Cl.
CPC ............ *B60C 9/005* (2013.01); *B60C 9/2204* (2013.01); *B60C 11/005* (2013.01); *D03D 1/0094* (2013.01); *D03D 15/00* (2013.01); *B60C 2009/0078* (2013.01); *B60C 2009/0092* (2013.01); *B60C 2009/2214* (2013.01); *B60C 2009/2257* (2013.01); *B60C 2009/2285* (2013.01); *B60C 2009/2295* (2013.01); *D10B 2331/02* (2013.01); *D10B 2331/04* (2013.01); *D10B 2505/12* (2013.01)

(58) Field of Classification Search
None
See application file for complete search history.

(56) References Cited

U.S. PATENT DOCUMENTS

| | | | |
|---|---|---|---|
| 4,284,117 A | 8/1981 | Poque et al. | |
| 5,115,853 A | 5/1992 | Oare et al. | |
| 7,584,774 B2 | 9/2009 | Nakajima | |
| 2012/0211139 A1* | 8/2012 | Li | B60C 9/2009 152/537 |

FOREIGN PATENT DOCUMENTS

| | | |
|---|---|---|
| EP | 855289 A1 | 7/1998 |
| EP | 1275526 A2 | 1/2003 |
| WO | 2014060877 A1 | 4/2014 |

* cited by examiner

*Primary Examiner* — Shawn Mckinnon
(74) *Attorney, Agent, or Firm* — Gokalp Bayramoglu

(57) ABSTRACT

The present invention relates to a novel tire cord fabric or strip made of alternating PET and nylon 6.6 warp cords which is used as tire reinforcement. Such a novel tire cord fabric or strips improve high speed durability, tread separation resistance and impact resistance when used as zero degree spirally wound cap ply in pneumatic radial tires.

20 Claims, 5 Drawing Sheets

CAP PLY STRIP WITH ALTERNATE NYLON 6,6 AND PET CORDS

CROSS REFERENCE TO RELATED APPLICATIONS

This application is the national phase entry of International Application No. PCT/TR2016/050382, filed on Oct. 13, 2016, the entire contents of which are incorporated herein by reference.

TECHNICAL FIELD OF INVENTION

The present invention relates to a novel tire cord fabric or strip comprising alternate PET and nylon 6.6 warp cords which is used as tire reinforcement. Such a novel tire cord fabrics or strips improve high speed durability, tread separation resistance and impact resistance when used as zero degree spirally wound cap ply on the belt package in pneumatic radial tires.

BACKGROUND OF THE INVENTION

Under high speed conditions, the outer diameter of the tire increases due to centrifugal forces generated by steel cord belt package and tread. Such a diameter increase or tire growth increases the pantographic movements of the belt edge cords leading to the crack initiations, crack propagations and at the end belt edge separations.

On the other hand, the temperature rise at belt edges under high speed conditions might cause local adhesion degradation of the textile cap ply strip and leads to local cap ply-tread separations which may subsequently result in belt edge separations in a short time due to non-uniform stress distributions.

The cap ply layer wound on belt package circumferentially prevents excessive tire growth under high speed conditions by applying compressive forces (restraining force) on heavy belt package made of cross-ply steel cord layers. In order to enhance the restraining force, high cord count (epdm) cap ply strips are usually used (e.g. Nylon, 1400×2, 110 epdm or Nylon 1400×1, 140 epdm etc.).

Currently, most widely used cap ply materials are nylon 6.6 and aramid/nylon hybrid cords which are spirally wound on belt package at 0 to 5 degrees to equatorial plane of the tire.

Nylon cords have excellent fatigue resistance under bending and axial compression, and bielastic tensile characteristic enabling easy processing during tire building. Additionally, shrink force generation with increasing service temperature under high speed conditions enhances belt edge separation resistance and improves high speed durability.

It is well known that the hybrid cords comprising high and low modulus yarns having bi-elastic tensile behaviour are also used as cap ply in high speed tires. The low modulus component of hybrid cord enables easy belt package lifting without excessive tight cord formation due to its high extensibility and the high modulus component becomes effective in service conditions. By using hybrid cords as cap ply, the total thickness of the cap ply layer and rubber content can be decreased, and the high modulus component of the hybrid cord improves the restraining force and high speed durability.

U.S. Pat. No. 4,284,117 describes a nylon cap ply which is formed from single yarns rather than cords. The cap ply is thinner than conventional cap plies having superior flexibility and heat dissipation characteristics. But the limited fatigue resistance of the single ply cords is the primary drawback of this application. The twist increase to improve the fatigue resistance leads to drastic modulus and restraining force drop.

U.S. Pat. No. 5,115,853 a radial tire having a cap ply structure disposed radially outwardly of the belt reinforcing structure. The cap ply structure comprises side by side nylon cords of 420×2 having cord twist of not greater than 280 tpm. The limited twist, in this case, low twist (low helix angle) has negative effects on fatigue resistance and impact resistance.

U.S. Pat. No. 7,584,774 describes a polyethylene terephthalate (PET) cord as belt reinforcing layer (cap ply) spirally wound on belt package in circumferential direction. Said PET cord has an elastic modulus not less than 2.5 mN/dtex. % under a load 29.4N at 160° C. High modulus drop of PET cord at high speed temperatures limits the durability performance.

SUMMARY OF THE INVENTION

The present invention relates to a novel tire cord fabric or strip made of alternating PET and nylon 6.6 warp cords which is used as tire reinforcement. Such a novel tire cord fabrics or strips improve high speed durability, tread separation resistance and impact resistance when used as zero degree spirally wound cap ply in pneumatic radial tires.

As well known, nylon 6.6 has excellent fatigue resistance and bi-elastic tensile behaviour which makes the lifting process possible without forming tight cords, and provides sufficient restraining force under high speed conditions. But due to low initial modulus of nylon 6.6 cord, it is necessary to use high epdm (ends per decimeter) fabrics or strips as cap ply to reach the sufficient restraining force on the belt package (FIG. 1).

On the other hand, PET cords have higher elastic modulus and glass transition temperature (Tg) than nylon 6.6, and that's why reduces flatspotting, noise generation and low to medium speed durability. But low level of surface activity of PET gives inferior static and dynamic adhesion compared with nylon 6.6.

Additionally, the cord-to-cord distance (rivet) in such fabrics or strips are too narrow which makes the rubber penetration difficult between the cords without scorch. As a result of low cord-to-cord distance due to high epdm, the rubber cracks can easily initiate between the cords under dynamic conditions due to high shear stresses. It is well proven, that the cord-to-cord distance (rivet area) is an important parameter controlling crack initiations and tire failures.

The present invention combines the high initial modulus and $T_g$ advantage of PET cord and the bi-elasticity, high fatigue resistance, enhanced adhesion and high thermal shrink force generation properties of nylon 6.6.

According to the invention in the cap ply strips, the nylon 6.6 and PET cords have different modulus or LASE, and different thermal shrink force values. During lifting (expansion) in the curing process, higher modulus PET cords (low extensible cords) are loaded much higher than that of nylon 6.6 cords (high extensible cords). As a result of higher cord loading, PET cords penetrate into the skim compound more than nylon 6.6 cords.

As a result of different penetration levels of PET and nylon 6.6 cords, the mono-ply cap strip layer becomes two layer cap strip (FIG. 2).

Definitions

Cord: The reinforcement element formed by twisting together two or more plied yarns.

Denier: The gramm weight of yarn having 9,000 meter length.

Dtex: The gramm weight of yarn having 10,000 meter length.

Flatspotting: Temporary-set of footprint shape during parking after high speed driving LASE: Load At Specified Load 7% LASE: Load At 7% Elongation Linear density: Weight per unit length as g/dtex or g/d (denier)

Restraining force: Force applied by cap ply on belt package during driving to prevent tire growth Total linear density: The sun of the nominal linear densities of the ply yarns of the cord Two-ply cord: Cord prepared by twisting together two plied yarns Three-ply cord: Cord prepared by twisting together three plied yarns Twist: Number of turns per meter (t/m or tpm)

Warp: The set of yarn or cord in all woven fabrics, that runs lengthwise and parallel to the selvage and is interwoven with the filling.

BRIEF DESCRIPTION OF THE DRAWINGS

a is cross ply steel cord belt package
   b is conventional cap ply on belt package
   c is tread

a is cross ply steel cord belt package
   b is cap ply on belt package according to invention
   c is tread

(1) before curing process, (2) after curing process
   S1: Cord-to-cord distance between A and B before process expansion and curing.
   S2: Cord-to-cord distance between A and B after process expansion and curing
   S3: Cord-to-cord distance between A and A after process expansion and curing
   S4: Cord-to-cord distance between B and B after process expansion and curing

(1) before curing process, (2) after curing process (1)—A+B+B+A+B+B+A+ . . . cord arrangement before process expansion and curing
   (2)—A+B+B+A+B+B+A+ . . . cord arrangement after process expansion and curing

(1)—A+A+B+A+A+B+A+A+ . . . cord arrangement before process expansion and curing
   (2)—A+A+B+A+A+B+A+A+ . . . cord arrangement after process expansion and curing

DETAILED DESCRIPTION OF THE INVENTION

Figure 1:
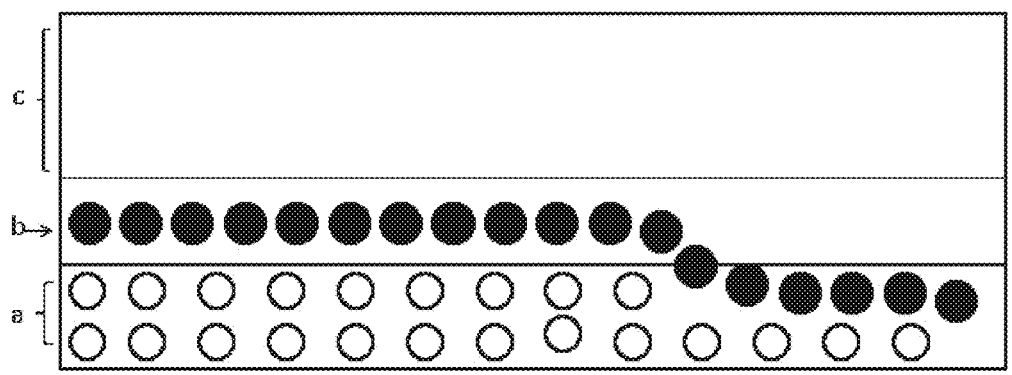
FIG. 1 is a cross-sectional view of conventional (prior art) nylon cap ply on cross-ply steel cord belt package after curing process.
Figure 2:
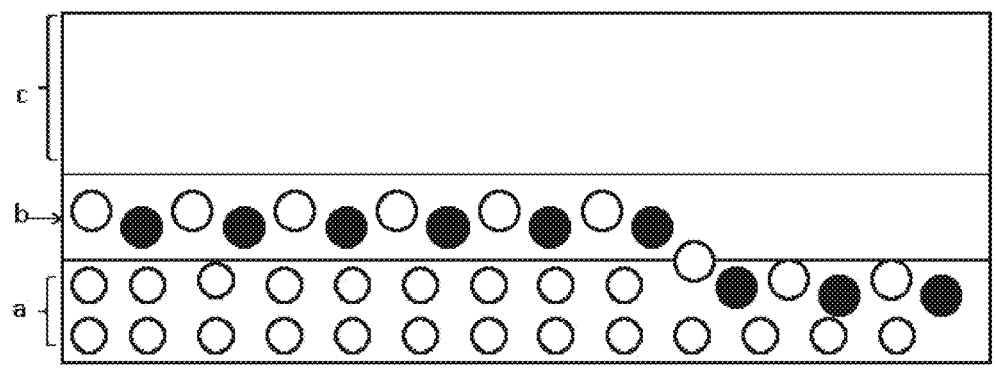
FIG. 2 is a cross-sectional view of cap ply according to invention comprising alternately arranged nylon 6.6 and PET cords on cross-ply steel cord belt package after curing process.
Figure 3A:
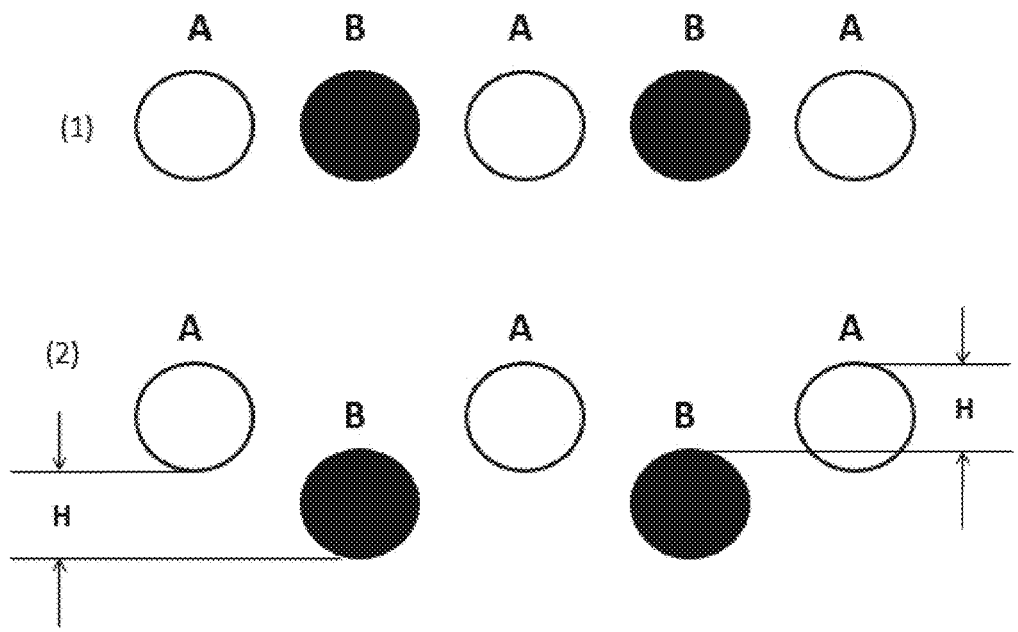
FIG. 3A is a cross-sectional view of the cap ply according to invention on cross-ply steel cord belt package, (1) before curing process, (2) after curing process A: Nylon 6.6 cord having lower initial modulus
   B: PET cord having higher initial modulus
   H: Cord penetration difference in rubber matrix
Figure 3B:
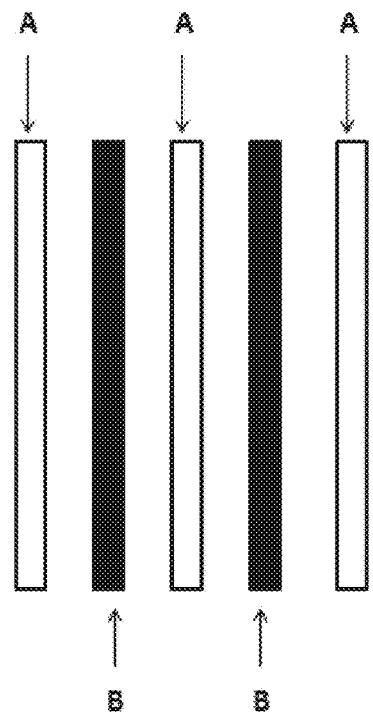
FIG. 3B is a top view of the cap ply strip made of A (nylon 6.6, lower modulus, lower tension) and B (PET, higher modulus, higher tension) cords
Figure 4A:
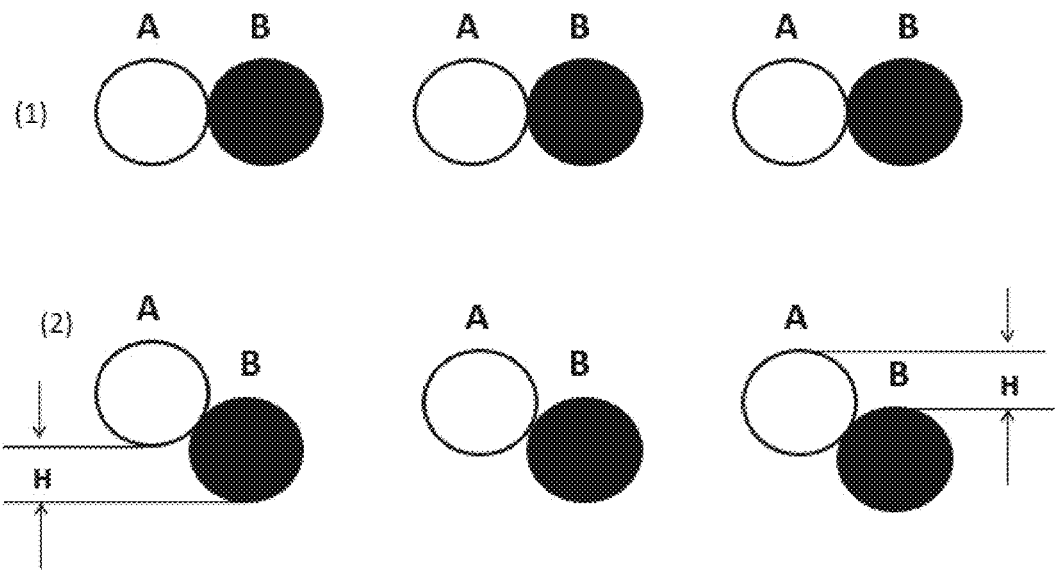
FIG. 4A is a cross-sectional view of the cap ply with side-by-side (nylon 6.6/PET) paired cords according to invention on cross-ply steel cord belt package, (1) before curing process, (2) after curing process
Figure 4B:
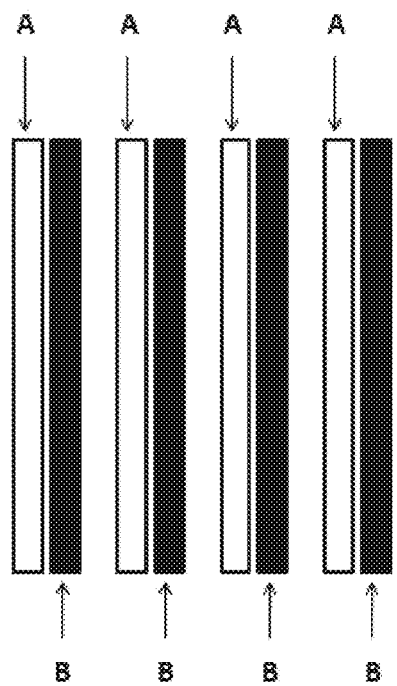
FIG. 4B is a top view of side-by-side (paired) A (nylon 6.6, lower modulus, lower tension) and B (PET, higher modulus, higher tension) cords in cap ply strip
Figure 5:
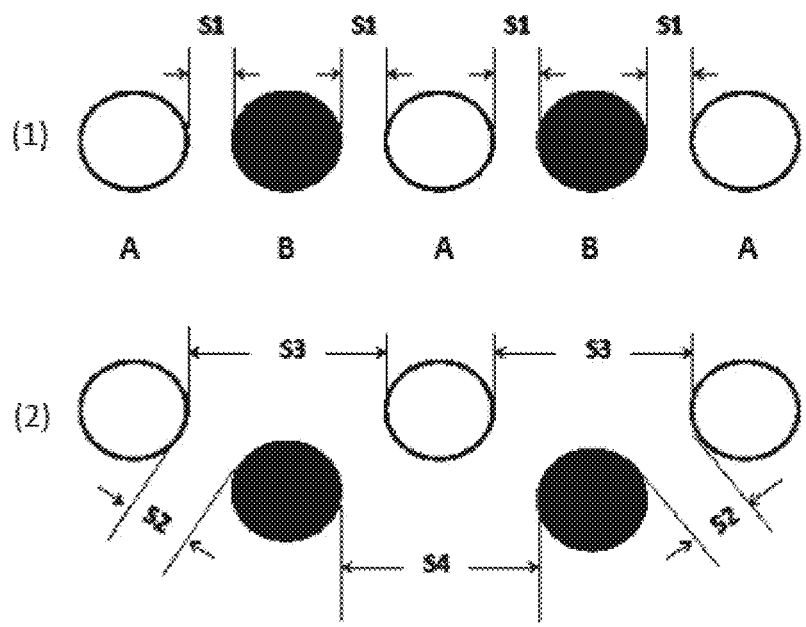
FIG. 5 shows the cord-to-cord distance changes after curing process.
Figure 6:
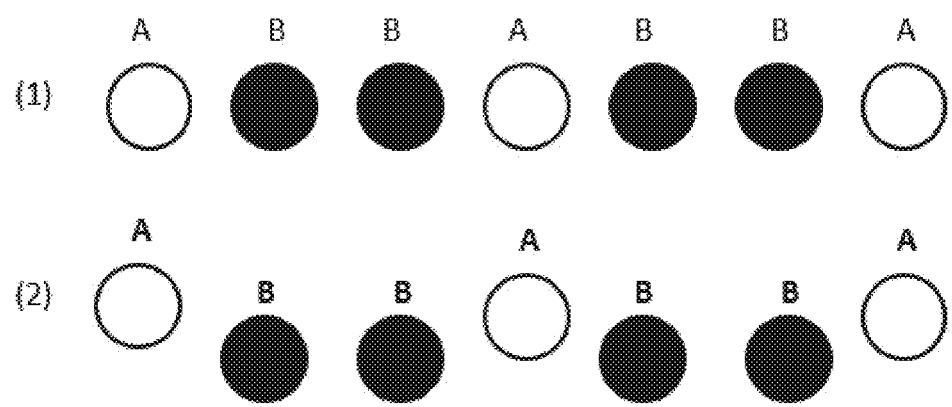
FIG. 6 shows 1+2+1 cord arrangements.
Figure 7:
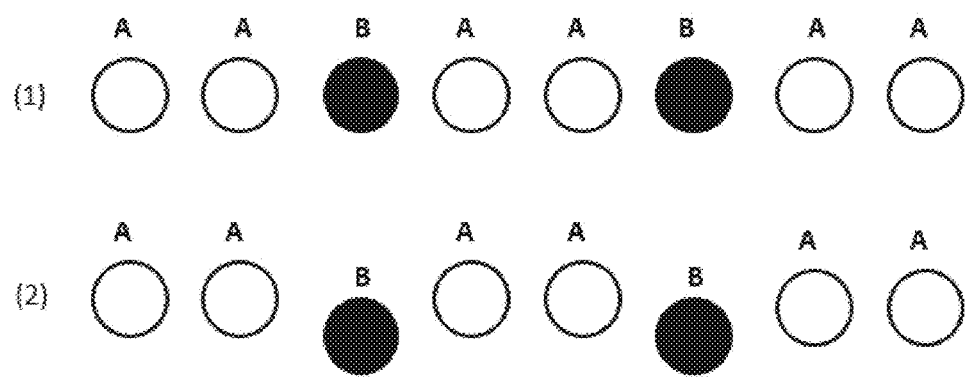
FIG. 7 shows 2+1+2 cord arrangements.

According to the invention, the spirally wound cap ply fabrics or cap ply strips on belt package of the pneumatic radial tires in circumferential direction, having alternate nylon 6,6 and PET cords as warp;

- improve the high speed durability due to high modulus of PET cords, high thermal shrink force of nylon 6.6 cords, and increased cord-to-cord distances (less shear stresses) between the cords (cord shiftings in vertical direction, two layer or zig-zag formation, FIGS. 3A, 3B and 5)
- improve the impact resistance of belt package due to higher energy absorption of nylon 6,6 and higher twist PET cords
- improves the tread-cap ply separation resistance due to the wavy surface structure of the cap ply. The zig-zag surface enhances also mechanical bonding between cap ply and tread compound
- and reduces flatspot problem due to less content of nylon 6,6 and higher $T_g$ of PET cord The nylon 6,6 and PET cords in cap ply strip are two or three-ply cords.

The angle of spirally wound cap ply strips to circumferential center line (or equatorial plane of the tire) is 0 to 5°.

In order to have effective nylon 6.6 modulus and fatigue resistance combination, the cable twist factor of the nylon 6.6 cord is minimum 10,000 and maximum 15,000 according to the following formula:

$$\text{Twist factor} = \text{cord cable twist} \times (\text{total cord linear density})^{1/2} \quad (1)$$

Twist as tpm

Linear density as dtex

In order to obtain the advantages mentioned above, the cable twist of the PET cord is at least 50 tpm higher than that of nylon 6,6 cord (e.g. nylon 6.6 cord, 1400×2, Z/S, 250/250 tpm, and PET cord, 1440×2, Z/S, 300/300 tpm or 350/350 tpm).

If the cord twist difference is less than 50 tpm between the first and the second cords, the LASE, modulus or extensibility difference between the first and the second cords becomes insignificant. Under those conditions, the wavy cap ply surface can not be created in tire.

The total linear densities of the cords are minimum 500 dtex and maximum 5,000 dtex. The cap ply cords having less than 500 dtex are too thin and LASE values are too low which can not provide enough restraining force even with very high cord counts (epdm). Besides this drawback, during process lifting and curing, they can cut the skim compound of the belt layer and contact to steel cords. The cap ply cords having higher than 5,000 dtex are too thick and requires too much rubber for coating. The potential drawback for such cords in tire is increased rolling resistance and heat build-up in crown area.

The total linear density difference between the first and the second cords is less than 15%. Preferably, the total linear densities of first and second cords should be same.

According to the invention, the sequence of the nylon 6,6 and PET cords parallel to each other in a cap ply strip is in an alternating form as A+B+A+B+A+B+ . . . and so on, wherein A is the nylon 6,6 cord with lower twist, and B is the PET cord with higher twist compared to A. Such a cap ply strip creates a uniform wavy surface after curing process, which bonds to tread compound strongly improving tread separation resistance under high speed conditions.

According to the invention, the sequence of the nylon 6,6 and PET cords parallel to each other in a cap ply strip is in an alternating form as AB+AB+AB+ . . . and so on, as paired cords, wherein A is the nylon 6,6 cord with lower twist, and B is the PET cord with higher twist compared to A.

According to the invention, the sequence of the nylon 6,6 and PET cords parallel to each other in a cap ply strip is in an alternating form as A+B+B+A+B+B+A+B+B+ . . . and so on, wherein A is the nylon 6,6 cord with lower twist, and B is the PET cord with higher twist compared to A.

According to the invention, the sequence of the nylon 6,6 and PET cords parallel to each other in a cap ply strip is in an alternating form as A+A+B+A+A+B+A+A+B+ . . . and so on, wherein A is the nylon 6,6 cord with lower twist, and B is the PET cord with higher twist compared to A.

According to the invention, the cord count in strip is minimum 70 epdm (ends per decimeter). In case of cord counts lower than 70 epdm, the effectiveness of surface waviness is not enough for mechanical bonding to tread.

According to the invention, the difference between the 7% LASE values of the first and second nylon cords is minimum 15%, and preferably 25% (7% LASE values are determined according to ASTM D885-16).

According to the invention, the width of the cap ply strips is 8 to 25 mm, preferably 10 to 15 mm.

The invention claimed is:

1. A cap ply strip comprising:
    alternately woven parallel nylon 6,6 and PET cords circumferentially wound on a belt package of a pneumatic radial tire;
    wherein a cable twist factor of the PET cord, determined according to the following formula Twist factor=cord cable twist×(total cord linear density)$^{1/2}$, is at least 15% higher than a cable twist factor of the nylon 6,6 cord;
    wherein the nylon 6,6 and the PET cords in the cap ply strip are arranged in a repeated pattern where two nylon 6,6 cords are followed by one PET cord.

2. The cap ply strip according to claim 1, wherein the cable twist factor of the nylon 6,6 cord is minimum 10,000 and maximum 15,000.

3. The cap ply strip according to claim 1, wherein the cable twist factor of the PET cords is less than 20,000.

4. The cap ply strip according to claim 1, wherein the nylon 6,6 cords and the PET cords are two-ply cords.

5. The cap ply strip according to claim 1, wherein the nylon 6,6 cords and the PET cords are three-ply cords.

6. The cap ply strip according to claim 1, wherein a-linear density of the nylon 6,6 cords and the PET cords is minimum 500 dtex and maximum 5,000 dtex.

7. The cap ply strip according to claim 1, wherein a difference of the linear densities between the nylon 6,6 and the PET cords is less than 15%.

8. A cap ply strip comprising:
    alternately woven parallel nylon 6,6 and PET cords circumferentially wound on a belt package of a pneumatic radial tire;
    wherein a cable twist factor of the PET cord, determined according to the following formula Twist factor=cord cable twist×(total cord linear density)$^{1/2}$, is at least 15% higher than a cable twist factor of the nylon 6,6 cord;

wherein the nylon 6,6 and the PET cords in said cap ply strip are arranged in a repeated pattern where one nylon 6,6 cord is followed by two PET cords.

9. The cap ply strip according to claim 1, wherein a-cord count in the strip is minimum 70 epdm (ends per decimeter).

10. The cap ply strip according to claim 1, wherein a difference of the 7% LASE values (determined according to ASTM D885-16) between the PET cords and the nylon 6,6 cords is minimum 25%.

11. The cap ply strip according to claim 1, wherein a difference of the 7% LASE values between the PET cords and the nylon 6,6 cords is minimum 35%.

12. The cap ply strip according to claim 1, wherein a-width of the cap ply strip is minimum 8 mm and maximum 25 mm.

13. The cap ply strip according to claim 1, wherein a-width of the cap ply strip is minimum 10 mm and maximum 15 mm.

14. The cap ply strip according to claim 8, wherein the cable twist factor of the nylon 6,6 cord is minimum 10,000 and maximum 15,000.

15. The cap ply strip according to claim 8, wherein the cable twist factor of the PET cords is less than 20,000.

16. The cap ply strip according to claim 8, wherein the nylon 6,6 cords and the PET cords are two-ply cords.

17. The cap ply strip according to claim 8, wherein the nylon 6,6 cords and the PET cords are three-ply cords.

18. The cap ply strip according to claim 8, wherein a-linear density of the nylon 6,6 cords and the PET cords is minimum 500 dtex and maximum 5,000 dtex.

19. The cap ply strip according to claim 8, wherein a-difference of the linear densities between the nylon 6,6 and the PET cords is less than 15%.

20. The cap ply strip according to claim 8, wherein a-cord count in the strip is minimum 70 epdm (ends per decimeter).

* * * * *